US011232166B2

(12) United States Patent
Howe et al.

(10) Patent No.: US 11,232,166 B2
(45) Date of Patent: Jan. 25, 2022

(54) NETWORKED PAGE ACCESS AND ADDRESSING BASED ON PARTIAL CATEGORIZATION INDEXING

(71) Applicant: salesforce.com, Inc., San Francisco, CA (US)

(72) Inventors: Andrew Howe, San Francisco, CA (US); Thomas E. Jones, San Francisco, CA (US); Curt Walker, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 387 days.

(21) Appl. No.: 16/250,700

(22) Filed: Jan. 17, 2019

(65) Prior Publication Data

US 2020/0233919 A1    Jul. 23, 2020

(51) Int. Cl.
*G06F 16/957*    (2019.01)
*G06F 16/955*    (2019.01)
*G06F 16/901*    (2019.01)
*G06F 16/954*    (2019.01)

(52) U.S. Cl.
CPC ...... *G06F 16/9577* (2019.01); *G06F 16/9014* (2019.01); *G06F 16/954* (2019.01); *G06F 16/9566* (2019.01)

(58) Field of Classification Search
CPC ............ G06F 16/9577; G06F 16/9566; G06F 16/9014; G06F 16/954; G06F 16/9558

USPC ...................................................... 707/706
See application file for complete search history.

(56) References Cited

U.S. PATENT DOCUMENTS

| | | | |
|---|---|---|---|
| 6,917,972 B1* | 7/2005 | Basko ................... | G06Q 30/02 709/223 |
| 2006/0004717 A1* | 1/2006 | Ramarathnam ....... | G06F 16/951 |
| 2009/0299978 A1* | 12/2009 | Farfurnik ............ | G06F 16/9566 |
| 2014/0108373 A1* | 4/2014 | Abrahami ............ | G06F 16/955 707/706 |
| 2016/0162596 A1* | 6/2016 | Reyes .................. | G06F 16/951 707/706 |
| 2016/0239569 A1* | 8/2016 | Levy .................... | G06F 16/951 |
| 2017/0212963 A1* | 7/2017 | Wahi ................... | G06F 16/9566 |

* cited by examiner

*Primary Examiner* — Michael Pham
(74) *Attorney, Agent, or Firm* — Butzel Long; Donald J. Lecher (57) ABSTRACT

A networked page access and addressing method to generate web pages responsive to requested client requests parses addresses of incoming requests into at least two logical segments: a first likely to represent a category and a second likely to represent a product. By generating hash values for the first segment, it can be compared against hashes in the internal directory to identify a local category corresponding to the represented in the address. If so, a local address can be generated by combining with the second segment with an identifier of that local category. Information from the data record at that local address can used to form a web page responsive to the request.

17 Claims, 3 Drawing Sheets

NETWORKED PAGE ACCESS AND ADDRESSING BASED ON PARTIAL CATEGORIZATION INDEXING

BACKGROUND

An e-commerce site operator often assigns search engine optimized addresses (SEO URLs) to the site's product and category-listing web pages to ensure they appear higher in search results generated by Google, Bing, and other search engines. Those addresses do not necessarily reflect the local addresses of those pages on the site but do reflect the categories to which the respective products and category-listings belong; hence, improving where the pages appear in general web searches for those and related products and categories.

Prior art methods of mapping those URLs to actual storage locations of the requested internal pages can consume substantial resources, both in terms of hardware and in terms of operator labor.

BRIEF DESCRIPTION OF THE DRAWINGS

A more complete understanding of the discussion that follows may be attained by reference to the drawings, in which.

DETAILED DESCRIPTION OF THE ILLUSTRATED EMBODIMENT

Architecture

Figure 1:
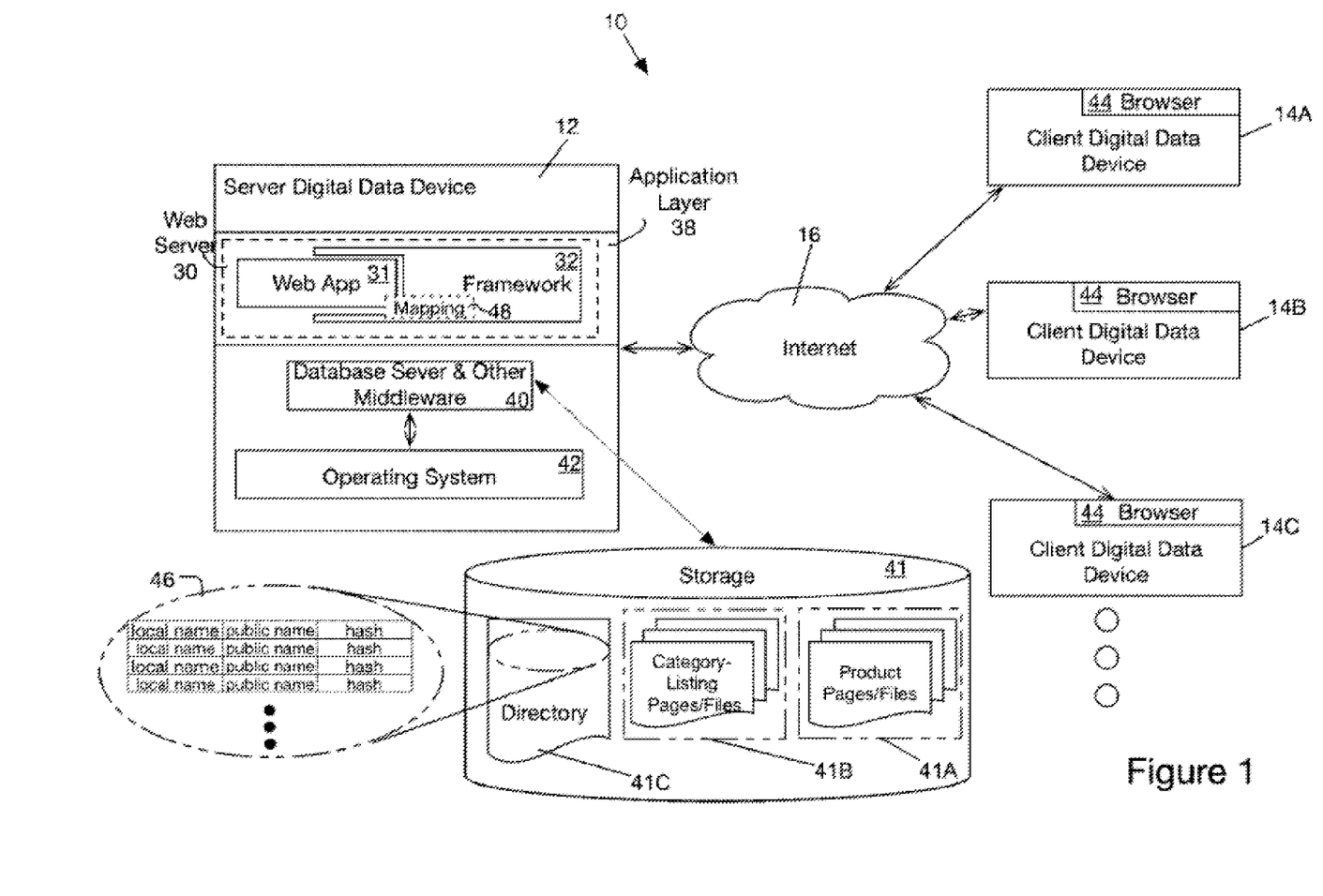
FIG. 1 depicts an environment in which an embodiment is employed.

FIG. 1 depicts a digital data processing system 10 of the type providing an environment in which an embodiment is employed. The system 10 includes a server digital data device ("server") 12 coupled to client digital data devices ("clients") 14A-14C via a network 16. By way of non-limiting example, illustrated server 12 hosts an e-commerce site of an online retailer and clients 14A-14C are digital devices (e.g., smart phones, desktop computers, and so forth) of users of that site. In other embodiments, server 12 may host a web site storing and/or otherwise providing access to other types of content, instead or in addition.

Devices 12, 14A-14C comprise conventional desktop computers, workstations, minicomputers, laptop computers, tablet computers, PDAs, mobile phones or other digital data devices of the type that are commercially available in the marketplace, all as adapted in accord with the teachings hereof. Thus, each comprises central processing, memory, and input/output subsections (not shown here) of the type known in the art and suitable for (i) executing software of the type described herein and/or known in the art (e.g., applications software, operating systems, and/or middleware, as applicable) as adapted in accord with the teachings hereof and (ii) communicating over network 16 to other devices 12, 14A-14C in the conventional manner known in the art as adapted in accord with the teachings hereof.

Examples of such software include web server 30 that executes on device 12 and that responds to requests in HTTP or other protocols from clients 14A-14C (and, more particularly, from the users thereof) for transferring web pages, downloads and other digital content to the requesting device over network 16, in the conventional manner known in the art as adapted in accord with the teachings hereof.

In the illustrated embodiment, web server 30 comprises web application 31 executing on device 12 within and/or in connection with a web application framework 32. Web application 31 comprises conventional such software known in the art (as adapted in accord with the teachings hereof) for effecting specific behavior by the server 12 in response to requests from clients 14A-14C at the behest of users thereof. This can include, for example, responding to requests by those clients for information on products and/or categories of products maintained in storage 41 local to or otherwise accessible by server 12 and returning that information, e.g., via web page, download or otherwise, to a requesting such client device, e.g., in cooperation with framework 32 and other components of server 12—all per convention in the art as adapted in accord with the teachings hereof.

Web framework 32 comprises conventional such software known in the art (as adapted in accord with the teachings hereof) providing libraries and other reusable services that are (or can be) employed—e.g., via an applications program interface (API) or otherwise—by multiple and/or a variety of web applications, only one of which is shown here (to wit, web application 31).

In the illustrated embodiment, web server 30 and its constituent components, web application 31 and web application framework 32, execute within an application layer 38 of the server architecture. That layer 38, which provides services and supports communications protocols in the conventional manner known in the art as adapted in accord with the teachings hereof, can be distinct from other layers in the server architecture—layers that provide services and, more generally, resources (a/k/a "server resources") that are required by the web application 31 and/or framework 32 in order to process at least some of the requests received by server 30 from clients 14A-14C. Those other layers include, for example, a data layer that provides services supporting interaction with a database server 40 (that interfaces with storage 41 for purposes of storing information thereto and/or retrieving information therefrom in the conventional manner known in the art as adapted in accord with the teachings hereof) and the server's operating system 42 (which manages the server hardware and software resources and provides common services for software executing thereon in the conventional manner known in the art as adapted in accord with the teachings hereof). Other embodiments may utilize an architecture with a greater or lesser number of layers and/or with layers providing different respective functionalities than those illustrated here.

Though described herein in the context of a web server 30, in other embodiments applications 31 and 32 may define other functionality suitable for responding to user requests, e.g., a video server, a music server, or otherwise. And, though shown and discussed here as comprising web application 31 and web framework 32, in other embodiments, the web server 30 may combine the functionality of illustrated components 31 and 32 in a single component or distribute it among still more components.

With continued reference to FIG. 1, client devices 14A-14C of the illustrated embodiment execute web browsers 44 that typically operate under user control to generate requests in HTTP or other protocols, e.g., to request web pages displaying information on products or other articles accessible via the site hosted by server 12, to request web pages displaying categories of such products or articles hosted by that site, and so forth, by way of non-limiting example, and to transmit those requests to web server 30 over network 16—all in the conventional manner known in the art as adapted in accord with the teachings hereof. Though referred to here as web browsers, in other embodiments applications 44 may comprise web apps or other functionality suitable for transmitting requests to a server 30 and/or presenting content received therefrom in response to those requests.

The devices 12, 14A-14C of the illustrated embodiment may be of the same type, though, more typically, they constitute a mix of devices of differing types. And, although only a single server digital data device 12 is depicted and described here, it will be appreciated that other embodiments may utilize a greater number of these devices, homogeneous, heterogeneous or otherwise, networked or otherwise, to perform the functions ascribed hereto to web server 30 and/or digital data processor 12. Likewise, although three client devices 14A-14C are shown, it will be appreciated that other embodiments may utilize a greater or lesser number of those devices, homogeneous, heterogeneous or otherwise, running applications (e.g., 44) that are, themselves, as noted above, homogeneous, heterogeneous or otherwise. Moreover, one or more of devices 12, 14A-14C may be configured as and/or to provide a database system (including, for example, a multi-tenant database system) or other system or environment; and, although shown here in a client-server architecture, the devices 12, 14A-14C may be arranged to interrelate in a peer-to-peer, client-server or other architecture and/or protocol consistent with the teachings hereof.

Network 16 comprises one or more networks suitable for supporting communications between server 12 and client device 14A-14C. The network comprises one or more arrangements of the type known in the art, e.g., local area networks (LANs), wide area networks (WANs), metropolitan area networks (MANs), and/or Internet(s). Although a client-server architecture is shown in the drawing, the teachings hereof are applicable to digital data devices coupled for communications in other network architectures.

As those skilled in the art will appreciate, the "software" referred to herein—including, by way of non-limiting example, browser 44, web server 30 and its constituent components, web application 31 and web application framework 32—comprise computer programs (i.e., sets of computer instructions) stored on transitory and non-transitory machine-readable media of the type known in the art as adapted in accord with the teachings hereof, which computer programs cause the respective digital data devices, e.g., 12, 14 to perform the respective operations and functions attributed thereto herein. Such machine-readable media can include, by way of non-limiting example, hard drives, solid state drives, and so forth, coupled to the respective digital data devices 12, 14 in the conventional manner known in the art as adapted in accord with the teachings hereof.

Described below is operation of the web application 31, working in cooperation with framework 32 and the other components of servers 12 and 30, as well as with browsers 44 and other components of client devices 14A-14C, all in the conventional manner known in the art as adapted in accord with the teachings hereof. Although many of the steps described below are ascribed to mapping element 48, it is within the ken of those skilled in the art to execute one or more of those steps on other components of servers 12 and 30 consistent with the teachings hereof.

Storage 41 of the illustrated embodiment maintains information on products and categories of products available or on which information is otherwise accessible via the ecommerce site supported by server 12. These are maintained in stores 41A and 41B, of product and category information, respectively, which may be in the form of tables, files, lists or other data structures, contained in memory (RAM), disk drives or other memory elements that are integral to or otherwise coupled (via local or remote access) to server 12, all per convention in the art as adapted in accord with the teachings hereof. Although information regarding products (or, as discussed below, other articles) is maintained in store 41A and that regarding categories is maintained in store 41B of the illustrated embodiment, other embodiments may vary in this regard. For example, product (or other article) and category information may be maintained in single store; conversely, multiple additional stores may be utilized to maintain this and other information—all as is within the ken of those skilled in the art in view of the teachings hereof.

Information regarding each product in store 41A is logically stored and accessible to web application 31 (e.g., via calls to data layer 40 and/or operating system 42) utilizing a local address formed by combining (i) the name of a local category with which that product is associated and (ii) a local identifier of that product. The address may have additional components, as well, such as protocol identifiers, disk, volume and/or folder names and file extensions—typically, but not necessarily, prefixing and suffixing the combined category name and local identifier—all per convention in the art as adapted in accord with the teachings hereof.

By way of non-limiting example, a store 41A that maintains HTML files (by way of non-limiting example) with information about Apple-brand computers, as well as Farmer Mac-brand apples, may maintain those files in store 41A at local logical addresses as follows:

C:\webstuff\comps\big\SteveJobs\imac.html
C:\webstuff\comps\big\SteveJobs\macpro.html
C:\webstuff\comps\small\SteveJobs\macbookpro.html
C:\webstuff\groc\tastyhealthy\apps\farmer-mac\macintosh.html
C:\webstuff\groc\tastyhealthy\apps\farm-mac\rome.html where, "C:\webstuff\" are components of the local addresses reflecting the disk ("C:") and folders ("\webstuff\") in which the product files are generally stored;

"comps\big\SteveJobs" and "comps\small\SteveJobs" are components of the local addresses reflecting both (i) the local categories with which the Apple-brand computer products are associated (to wit, "comps", "big", "small" and "SteveJobs") and (ii) the subfolders in which product files for Apple-brand computers are stored;

"imac", "macpro" and "macbookpro" are components of the local addresses reflecting local identifiers of iMac, Mac Pro and MacBook Pro computer products, respectively;

"groc\tastyhealthy\apps\farm-mac\" are components of the local addresses reflecting both (i) the local categories with which the Farmer Mac-brand apples are associated (to wit, "groc", "tastyhealthy", "apps", and "farmer-mac") and (ii) the subfolders in which product files for Farmer Mac-brand apples are stored;

"macintosh", "Rome" are components of the local addresses reflecting local identifiers of macintosh and rome apples, respectively; and .html is a file extension component of the local addresses reflecting the type of file in which the product information is stored—in this example hypertext markup language.

The foregoing is by way of example only. Thus, for example, although the local addresses shown above reflect that the product files (e.g., imac.html, macpro.html, etc.) are stored in a hierarchical folder structure based on the local category hierarchy, other embodiments may utilize a flat structure, e.g., with product files like those in the above example logically accessible in store 41A at local logical addresses as follows, again, by way of non-limiting example:

C:\webstuff-comps-big-SteveJobs-imac.html
C:\webstuff-comps-big-SteveJobs-macpro.html
C:\webstuff-comps-small-SteveJobs-macbookpro.html
C:\webstuff-groc-tastyhealthy-apps-farmer-mac-macintosh.html
C:\webstuff-groc-tastyhealthy-apps-farm-mac-rome.html Without deviating from the spirit of the above, in embodiments in which server 12 hosts sites other than an e-commerce retail site, store 41A can maintain information on products and/or other things, as well as on the categories in which those products and/or other things are associated. In the discussion that follows (and elsewhere herein) the term "articles" is used to refer to such products and/or things. As above, information regarding each such article in store 41A is logically stored and accessible to web application 31 (e.g., via calls to data layer 40 and/or operating system 42) utilizing a local address formed by combining (i) the name of a local category with which that article is associated and (ii) a local identifier of that article.

Regardless of whether for an e-commerce retail site or otherwise, information regarding some articles in store 41A of some embodiments may be logically stored and accessible to web application 31 (again, e.g., via calls to data layer 40 and/or operating system 42) utilizing local addresses that do not include category information but, rather, are formed from identifiers of those articles alone. As above, those address may have additional components, as well, such as protocol identifiers, disk, volume and/or folders names and file extensions—typically, but not necessarily, prefixing and suffixing the local identifier—all per convention in the art as adapted in accord with the teachings hereof.

In such an embodiment product files like those in the above example may be logically accessible in store 41A at local logical addresses as follows, again, by way of non-limiting example:

C:\imac.html
C:\macpro.html
C:\macbookpro.html
C:\farmer-mac-macintosh.html
C:\farmer-mac-rome.html The storage of and access to information regarding products and other articles in store 41A per the discussion above may be effected in a conventional manner known in the art as adapted in accord with the teachings hereof.

Although not a requirement of the illustrated embodiment, local identifiers of products or other articles in store 41A equate with (i.e., are one in the same as) the search engine optimized (SEO) identifiers of those respective products or articles. As per convention in the art, the SEO identifier (ID) of a product/article is an identifier that
  i. includes—along with a domain name, file extension and other optional prefixes and suffixes—a term (or terms) by which the public commonly refers to such product/article, and
  ii. when used to address web pages, videos and other internet content regarding such product/article or category tends to result in that content appearing higher in results generated by Google, Bing, and other search engines, in response to searches by the public using the common term (or terms).

As a practical matter, the SEO ID of a product/article tends to more descriptive of it to the end user. By way of example, in reference to a web page concerning an Apple-brand iMac computer, a hypothetical SEO URL in the form "http://imac.html" is more descriptive to the average member of the public than, say, "http://im.html". Creation of such SEO IDs, which are sometimes referred to herein as "public" addresses (and the terms from which they are constructed, "public" names), is within the ken of those skilled in the art in view of the teachings hereof.

As noted above, in addition to maintaining information on products or other articles is available or on which information is otherwise accessible via the site supported by server 12, storage 41 maintains information on categories with which those products or other articles are associated. That information can include, for example, names of, descriptions of, and/or links to pages or files in which information on each product within the category is stored, as well as those of related categories, and so forth—all per convention in the art.

Information regarding each such category in store 41B is logically stored and accessible to web application 31 (e.g., via calls to data layer 40 and/or operating system 42) utilizing a local address formed from the local name of that category, typically, though not necessarily including its parent categories. The address may have additional components, as well, such as protocol identifiers, disk, volume and/or folder names—typically, but not necessarily, prefixing the combined category name and local identifier—all per convention in the art as adapted in accord with the teachings hereof.

Continuing the examples above, a store 41B that maintains HTML files (by way of non-limiting example) with information about categories associated with Apple-brand computers and Farmer Mac-brand apples, may maintain those files in store 41B at local logical addresses as follows:

C:\webstuff\comps.html
C:\webstuff\comps\big.html
C:\webstuff\comps\small.html
C:\webstuff\comps\big\SteveJobs.html
C:\webstuff\comps\small\SteveJobs.html
C:\webstuff\groc.html
C:\webstuff\groc\tastyhealty.html
C:\webstuff\groc\tastyhealty\apps.html
C:\webstuff\groc\tastyhealty\apps\farmer-mac.html
where,
  "C:\webstuff\" are components of the local addresses reflecting the disk ("C:") and folders ("\webstuff\") in which the local category files are generally stored;
  "comps", "comps\big", "comps\small", "comps\big\SteveJobs" and "comps\small\SteveJobs" are components of the local addresses reflecting the local categories with which the Apple-brand computer products are associated (to wit, "comps", "big", "small" and "SteveJobs");
  "groc\tastyhealthy\apps\farm-mac\" are components of the local addresses reflecting the local categories with which the Farmer mac-brand apples are associated (to wit, "groc", "tastyhealthy", "apps", and "farmer-mac");
  .html is a file extension component of the local addresses reflecting the type of file in which the category information is stored—in this example hypertext markup language.

The foregoing is by way of example only. Thus, for example, although the local addresses shown above reflect that the category files (e.g., comps.html, big.html, etc.) are stored in a hierarchical folder structure, other embodiments may utilize a flat structure, e.g., with category files like those in the above example logically accessible in store 41B at local logical addresses as follows, again, by way of non-limiting example:

C:\webstuff-comps.html
C:\webstuff-comps-big.html
C:\webstuff-comps-small.html
C:\webstuff-comps-big-SteveJobs.html
C:\webstuff-comps-small-SteveJobs.html
C:\webstuff-groc.html
C:\webstuff-groc-tastyhealty.html
C:\webstuff-groc-tastyhealty-apps.html
C:\webstuff-groc-tastyhealty-apps-farmer-mac.html The storage and access of information regarding categories in store 41A per the discussion above may be effected in a conventional manner known in the art as adapted in accord with the teachings hereof.

Although not a requirement of the illustrated embodiment, local identifiers of categories in store 41B typically do not equate with (and, indeed, can differ substantially from) the search engine optimized (SEO) addresses or SEO uniform resource locators (SEO URLs) of those respective categories. As above, per convention in the art, the SEO URL of a category is a web address (or URL) that
   i. includes—along with a domain name, file extension and other optional prefixes and suffixes—a term (or terms) by which the public commonly refers to that category (or to products/articles in that category), and
   ii. when used with web pages, videos and other internet content regarding that category tends to result in that content appearing higher in results generated by Google, Bing, and other search engines, in response to searches by the public using the common term (or terms).

Creation of such SEO URLs, which are sometimes referred to herein as "public" addresses (and the terms from which they are constructed, "public" names), is within the ken of those skilled in the art in view of the teachings hereof.

To generate web pages, downloads or otherwise from server 12 in response to requests from client devices 14A-14C, the web application 31, framework 32 and/or other components of the application layer 38 utilize a directory (or "index") 41C to facilitate mapping SEO addresses included with those requests, e.g., as URLs or other addressing parameters, to local addresses at which product (or other article) or category information referenced by SEO addresses is logically stored in stores 41A, 41B.

The index 41C—which may be in the form of tables, files, lists or other data structures, contained in memory (RAM), disk drives or other memory elements that are integral to or otherwise coupled (via local or remote access) to server 12, all per convention in the art as adapted in accord with the teachings hereof—comprises a plurality of entries 46 (FIG. 1) that each
   i. are associated with a local category. (In some embodiments that association is established by way of inclusion of the local name of that category in the entry. In other embodiments, it is established by way of pointers or otherwise, per convention in the art as adapted in accord with the teachings hereof.)
   ii. include a public category identifier (e.g., an SEO name) of that local category, and
   iii. include a hash value generated from that public category identifier.

Such an index can be created per convention in the art as adapted in accord with the teachings hereof. Creation can be initiated automatically, e.g., by framework 32 or another component of server 12, though, more typically, creation is initiated through an administrative interface (GUI or otherwise) at the request of the owner of a site supported by server 12, e.g., after stores 41A and 41B are populated with product/article content and category content, respectively, all per convention in the art as adapted in accord with the teachings hereof.

Regardless of how initiated, in the illustrated embodiment creation of index 41C is effected by mapping element 48 (which is discussed further below) utilizing the following steps:
   1. Traverse categories represented in store 41B. This may be a hierarchical tree or otherwise.
   2. For each category found in step (1), immediately above, create a new entry (or record) in index 41C that includes
      the SEO URL of that category. The SEO URL can generated by reference to a table of common names (e.g., available publicly, proprietarily or otherwise), through parsing of metadata associated with each category in step 41B, through based on predefined logic (typically based on category hierarchy).
      a hash of the SEO URL suitable for finding the newly created entry when attempting to map a URL request by a client device 14A-14C to a given record in the index 14C in accord with the teachings hereof. Generation of such a hash is within the ken of those skilled in the art in view of the teachings hereof.
      the local name of the category (or a pointer to a record, e.g., in store 41B with that name).

As noted above, web application 31 and, more generally, web server 30 responds to requests from clients 14A-14C, and more specifically, for example, their respective browsers 44, by generating web pages, downloads or otherwise with information from local files implicated by those requests—e.g., local files whose addresses can be mapped by the mapping element 48 (in cooperation with directory 41C) to SEO URLs in those requests. Preferably, the web pages, downloads or otherwise generated in those responses also include such SEO URLs, e.g., in embedded hypertext links or otherwise in connection with the respective products/articles and categories.

In order to generate those SEO URLs, the mapping element 48 or other component of the server 12 (e.g., web application 31, web server 30 and/or framework 30, etc.) executes the following steps:
   1. For a category from store 41B, the SEO URL for a web page (or other output, e.g., by web server 30) with information for that category is determined by
      a. finding an entry in the index 41C associated with a local category matching that of the category record from store 41B;
      b. taking the SEO URL from the entry found in step (a), immediately above;
      c. adding to the SEO from step (b), immediately, above, the domain name, file extension and other prefixes or suffixes
   2. For a product/article from store 41A, the SEO URL for a web page (or other output, e.g., by web server 30) with information that product is determined by:
      a. determining if the product/article fall in one or more local categories in store 41B (e.g., as determined from the product/article file in store 41A and/or from category files in store 41B);
      b. if the product/article is related to local categories as determined in step (a), immediately above, i. finding the entry associated with each such local category within the index 41C and, if there are multiple such entries, choosing the one flagged as being associated with a preferred or "canonical" SEO URL (if none are so designated, choosing the SEO URL from the oldest or most recent entry in index 41C, depending on implementation, or otherwise);

ii. taking the SEO URL from the entry found (or chosen) in step (i), immediately above;

iii. adding to the SEO URL from step (ii), immediately, above, the domain name, other prefixes or suffixes; and iv. completing the SEO URL by adding the local identifier of the product/article to the SEO URL from step (iii), immediately above. Typically, that identifier forms part of the "slug" for the file associated with that product/article in store 41A, and as noted above, in the illustrated embodiment can equate with the SEO ID of the product/article;

c. If the product/article is not related to any local categories, build the SEO URL from the product/article local identifier (e.g., as indicated by the slug of the product/article file in store 41A), adding the domain name and file extension, as well as any other prefixes or suffixes.

Discussed in the sections below is a mapping element 48 utilized by the web server 30 to convert incoming SEO addresses to local addresses utilizing the directory/index 41C. That element 48, which can be implemented in software and can form part of the web application 31 and/or framework 32 (or other component of the web server 30 and/or application layer 38), can be implemented utilizing conventional software techniques within the ken of those skilled in the art in view of the teachings hereof. Thus, by way of non-limiting example, mapping element 48 can be implemented as a function within framework 32 that is invoked by application 31 for processing the URLs of incoming client requests, or otherwise, all per convention in the art as adapted in accord with the teachings hereof.

Figure 2:
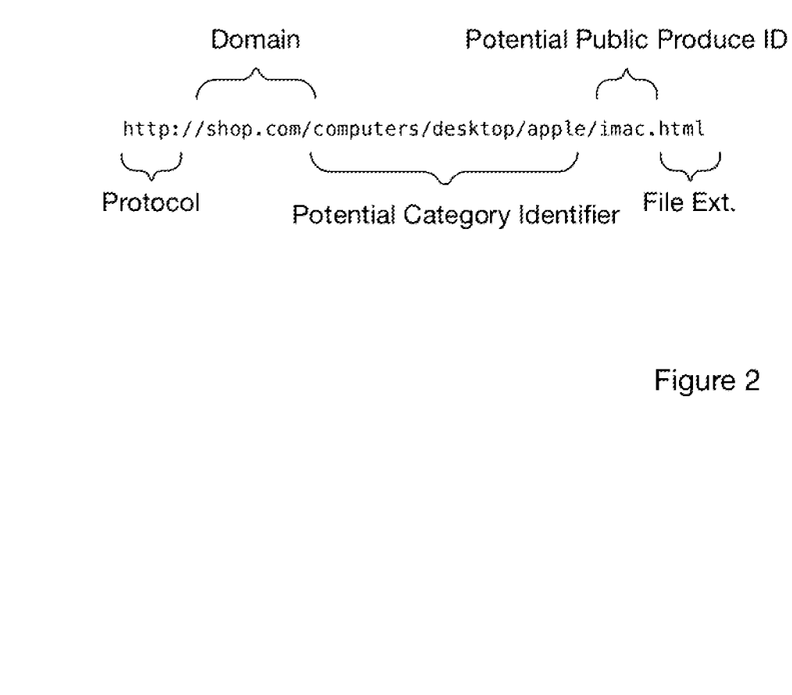
FIG. 2 depicts components of an SEO URL utilized in the illustrated embodiment.

By way of overview, upon invocation, the mapping element 48 can parse an SEO address (or "SEO URL") received from a browser 44 into at least two logical segments: a first, potentially representing a category identifier, and a second, potentially representing a product (or other article) identifier. Prefixes and suffixes of the SEO URL defining, for example, protocols (e.g., HTTP), file extensions (e.g., HTML), are ignored. The foregoing is illustrated, by way of non-limiting example, in FIG. 2, showing portions of an exemplary SEO URL and segments thereof.

By generating a hash value of the first segment, the element 48 can compare that hash against hashes in the directory 46 to find an entry in it with a public category matching that in the first URL segment. If a match is found, a local address can be generated by combining, with the second URL segment, the name of the local category contained in or otherwise associated with matching directory entry. That address can be used by the web application 31 to invoke the database server 40, operating system 42 or other element of the server 12 to retrieve a file (or other data structure) from store 41A or 41B and, with information from that file, the web application can generate a web page or other response to the client request.

Unlike prior art solutions, which would require an internal directory including entries for all product/category combinations to provide such mapping, the directory 41C need only include category entries. By using such a directory in combination with the methodology above, a web application 31 (and, more generally, web server 30) benefits from a multi-fold reduction in directory size and cost without a loss of speed.

Figure 3:
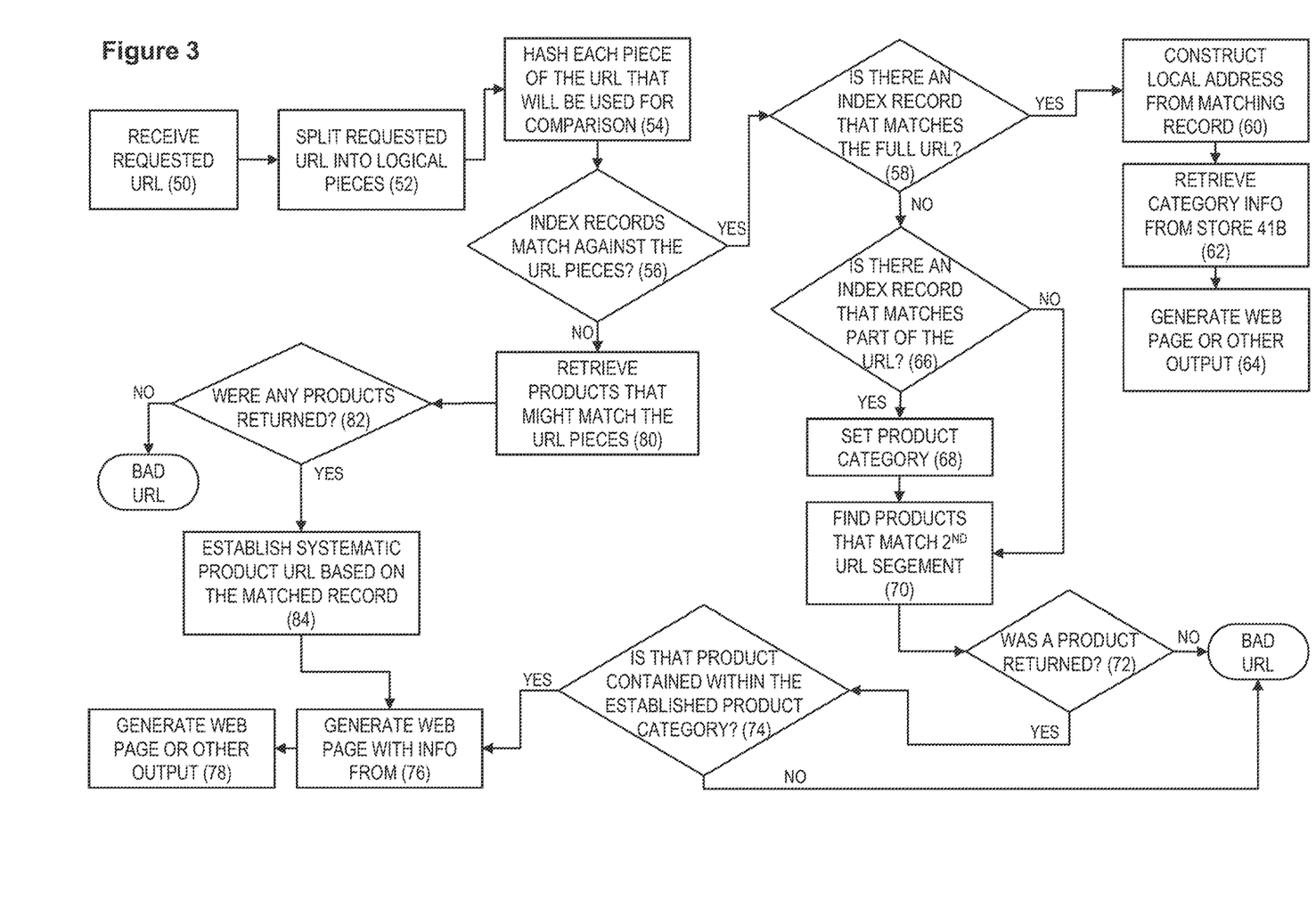
FIG. 3 depicts mapping of an SEO URL to a local address in the system of FIG. 1.

FIG. 3 depicts operation of the mapping element 48 in the broader context of the operation of web application 31 and, more generally, web server 30, in response to a request received, in step 50, from a client device 14A-14C for access to a web page (or other content) identified by an SEO URL. That request can be generated by a browser 44 of the client device, a web application or otherwise, per convention in the art as adapted in accord with the teachings hereof. And, though the address is specified as a URL of the request in the illustrated embodiment discussed here, in other embodiments the address may be specified otherwise, all per convention in the art as adapted in accord with the teachings hereof.

When a request is received, the address specified by it (i.e., the SEO URL, or "public address") is parsed by the mapping element 48 into first and second logical segments (or "pieces") as described above, to wit, a first segment potentially representing a category identifier and a second potentially representing a product (or other article) identifier. See step 52.

The potential category identifier is assumed to be the entire path component of the request (or incoming) URL with the last slug omitted. This will be used to map to a product listing within the context of a category. The potential product ID or SEO ID is assumed to be the last slug of the path component of the incoming URL. The full requested URL is also treated as a segment, in the event it maps directly to a category in the local store 41B. Prefixes and suffixes of the SEO URL defining, for example, protocols (e.g., HTTP), file extensions (e.g., HTML), are discarded during parsing.

Parsing of the request URL consistent with the foregoing can be performed in a conventional manner known in the art consistent with the teachings hereof.

In step 54, mapping element 48 generates a hash of the potential category identifier, of the potential product identifier and of the full URL (minus prefixes and suffixes, as discussed above). These hashes are generated in the same manner (e.g., using a same hashing algorithm) as that used in populating entries of the index 41C, described above.

In steps 56-58, the mapping element 48 uses the hashes generated in step 54 to determine if there is a direct match between the SEO URL in any entries (or records) in the index 41C and any of the incoming URL segments (and, more particularly, the first such segment or the incoming URL as a whole). If there is a match against the full requested URL (step 58), then the request received from the client 14A-14C is directed to a category. In that instance, a local address is constructed from the local category associated with the matching record/entry in the index 41C (step 60). The mapping element can invoke the database server 40 or operating system 42 with that local address to retrieve information regarding the requested category (step 62) and can return that information, e.g., in the form of a web page or otherwise, to the requesting client (step 64).

If there was a match against the partial URL in step 56 but not the full URL in step 58, then the requested URL might be for a product (or article) falling with a matching category or categories. See step 66 (which can utilize a result determined in step 56). In that instance, the mapping element 48 takes the matching category(ies) as defining a scope of permissible product matches. See step 68. Element 48 then searches store 41A for products associated with that/those category(ies) whose local identifiers match the second portion of the incoming URL, i.e., the potential product ID. See step 70. Such searching can be done by brute force, by searching of sorted lists, or otherwise, as is within the ken of those skilled in the art based on the teachings hereof.

In some embodiments, searching step 70 is executed by constructing a local address from (i) a local category name associated with the matching index entries identified in steps 56 or 66, and (ii) the potential category identifier of the incoming URL—and, specifically, by concatenating the latter to the former, and by prefixing or suffixing the result with volume identifiers, file extensions and so forth. The mapping element 48 can construct such a local address for each matching index entry identified in steps 56 or 66, and the mapping element 48 can invoke the database server 40 and/or operating system 42 to find matching files, if any, in store 41A.

If the searching in step 70 in successful, the mapping element. 48 can confirm that the found product is within a category identified as a match in steps 56 or 66 (see step 74)—e.g., if such confirmation was not already implicitly performed as part of step 70. The mapping element 48 can then invoke the database server 40 or operating system 42 to retrieve information from the product record identified in step 70 and can return that information, e.g., in the form of a web page, to the requesting client. See steps 76, 78.

If step 56 fails to identify a match between the hashes generated in step 54, mapping element 48 searches store 41A for products whose local identifiers match the second portion of the incoming URL, i.e., the potential product ID. See steps 80-84. Such searching can be done by brute force, by searching of sorted lists, or otherwise, as is within the ken of those skilled in the art based on the teachings hereof. If successful, the mapping element 48 can invoke the database server 40 or operating system 42 to retrieve information from the matching product record and can return that information, e.g., in the form of a web page, to the requesting client. See steps 76, 78.

It will be appreciated that one or more of the operations attributed to element 48 in the discussion above may be performed by other components of the server 12 or otherwise.

Moreover, although FIG. 3 refers to "products," the teachings thereof are equally applicable to other articles in store 41A.

Described herein and shown in the drawings are examples falling within the scope of the claims. It will be appreciated that other embodiments, incorporating changes to those shown here also fall within the scope of the claims that follow.

We claim:

1. A data access method, comprising performing with a server digital data processor steps of
   receiving from a requesting digital data processor a request for access to information from a data record, the request including a public address,
   parsing the public address into plural segments,
   generating a first hash value from a first segment of the plural segments representing a category identifier,
   identifying a local category from an entry containing a second hash value matching the first hash value in a directory,
   generating a local address by combining a name of the local category contained in the entry with a second segment of the plural segments representing a product identifier,
   retrieving the requested data record from a data store based on the generated local address, and
   transmitting to the requesting digital data processor information from the requested data record.

2. The method of claim 1, the directory including a plurality of entries, each entry being associated with a local category and including
   (i) a public category identifier of that local category and
   (ii) a hash value generated from that public category identifier.

3. The method of claim 1, the data store including a plurality of records, each pertaining to an article and each stored at a local address based on
   (i) a local category with which the article is associated, and
   (ii) a local identifier of the article.

4. The method of claim 1, the public address being a web address.

5. The method of claim 4, the web address being a search engine optimized (SEO) uniform resource locator (URL).

6. The method of claim 5, the parsing step including parsing into the first segment of the plural segments a public category identifier component of the SEO URL and parsing into the second segment of the plural segments a public article identifier component of the SEO URL.

7. The method of claim 6, the retrieving step including retrieving the requested data record at an address based on
   (i) an identifier of the local category, and
   (ii) the public article identifier.

8. The method of claim 1, the retrieving step including mapping the public address to a local address.

9. The method of claim 8, the mapping step including generating the local address as a function of an identifier of the local category and of the second segment of the plural segments.

10. The method of claim 9, the mapping step including generating the local address by concatenating the identifier of the local category and the second segment of the plural segments.

11. The method of claim 1, comprising generating the local address from the first and second segments of the plural segments.

12. The method of claim 11, comprising generating the local address by concatenating the first and second segments of the plural segments.

13. The method of claim 12, the retrieving step including retrieving the requested data record from the data store at a said local address generated by concatenating the first and second segments of the plural segments.

14. The method of claim 1, comprising retrieving the requested data record from a third data store at a local address corresponding to the public address, the third data store comprising data records identifying local categories.

15. A data access and addressing method, comprising performing with a server digital data processor steps of
   receiving from a requesting digital data processor a request for access to information from a data record, the request including a web address that is a search engine optimized (SEO) uniform resource locator (URL),
   parsing the web address into plural segments including at least
      a public category identifier segment and
      a public article identifier segment,
   generating a first hash value from the public category identifier segment representing a category identifier,
   identifying a local category from an entry containing a second hash value matching the first hash value in a directory, the directory including a plurality of entries, each entry being associated with a local category and including
(i) a public category identifier of that local category and
(ii) a second hash value generated from that public category identifier, mapping the web address to a local address generated by combining
a name of the local category identified in the identifying step with
the public article identifier segment of the plural segments representing the public article product identifier,
retrieving the requested data record from a data store at the local address, and
transmitting to the requesting digital data processor information from the requested data record.

16. The method of claim 15, comprising generating a web address of a data record in the data store as a function of
(i) a local article identifier with which that data record is associated, and
(ii) a public category identifier associated by an entry in the directory with a local category with which the data record is associated.

17. The method of claim 16, comprising generating the web address of the data record by concatenating
(i) any of the local article identifier with which that data record is associated and a public article identifier associated with that local article identifier, and
(ii) a public category identifier associated by an entry in the directory with a local category with which the data record is associated.

* * * * *